(12) United States Patent
Shustorovich et al.

(10) Patent No.: US 11,302,109 B2
(45) Date of Patent: *Apr. 12, 2022

(54) RANGE AND/OR POLARITY-BASED THRESHOLDING FOR IMPROVED DATA EXTRACTION

(71) Applicant: Kofax, Inc., Irvine, CA (US)

(72) Inventors: Alexander Shustorovich, Pittsford, NY (US); Christopher W. Thrasher, Rochester, NY (US)

(73) Assignee: KOFAX, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,247

(22) Filed: Sep. 12, 2019

(65) Prior Publication Data

US 2020/0005035 A1    Jan. 2, 2020

Related U.S. Application Data

(63) Continuation of application No. 15/396,327, filed on Dec. 30, 2016, now Pat. No. 10,467,465, which is a
(Continued)

(51) Int. Cl.
*G06K 9/00* (2006.01)
*G06V 30/414* (2022.01)
(Continued)

(52) U.S. Cl.
CPC .............. *G06V 30/414* (2022.01); *G06T 7/11* (2017.01); *G06T 7/136* (2017.01); *G06T 7/187* (2017.01);
(Continued)

(58) Field of Classification Search
CPC .... G06K 9/00463; G06K 9/342; G06K 9/344; G06K 9/38; G06K 2209/01–015;
(Continued)

(56) References Cited

U.S. PATENT DOCUMENTS 5,764,813 A    6/1998    Murayama et al.
6,075,905 A    6/2000    Herman et al.
(Continued)

FOREIGN PATENT DOCUMENTS

EP    2388735 A2    11/2011

OTHER PUBLICATIONS

Final Office Action from U.S. Appl. No. 15/051,587, dated Jan. 27, 2020.
(Continued)

*Primary Examiner* — Sean T Motsinger
(74) *Attorney, Agent, or Firm* — Zilka-Kotab, P.C.

(57) ABSTRACT

Computerized techniques for improved binarization and extraction of information from digital image data are disclosed in accordance with various embodiments. The inventive concepts include rendering a digital image using a plurality of binarization thresholds to generate a plurality of binarized digital images, wherein at least some of the binarized digital images are generated using one or more binarization thresholds that are determined based on a priori knowledge regarding an object depicted in the digital image; identifying one or more connected components within the plurality of binarized digital images; and identifying one or more text regions within the digital image based on some or all of the connected components. Systems and computer program products are also disclosed.

20 Claims, 6 Drawing Sheets

Related U.S. Application Data continuation-in-part of application No. 15/214,351, filed on Jul. 19, 2016, now Pat. No. 10,242,285.

(60) Provisional application No. 62/194,783, filed on Jul. 20, 2015.

(51) Int. Cl.

| | | |
|---|---|---|
| *G06T 7/11* | (2017.01) | |
| *G06T 7/136* | (2017.01) | |
| *G06T 7/187* | (2017.01) | |
| *G06V 10/28* | (2022.01) | |
| *G06V 10/26* | (2022.01) | |
| *G06V 30/148* | (2022.01) | |
| *G06V 30/10* | (2022.01) | |

(52) U.S. Cl.
CPC ............ *G06V 10/267* (2022.01); *G06V 10/28* (2022.01); *G06V 30/153* (2022.01); *G06T 2207/20104* (2013.01); *G06V 30/10* (2022.01)

(58) Field of Classification Search
CPC . G06T 7/187; G06T 7/136; G06T 7/11; G06T 2207/20104
See application file for complete search history.

(56) References Cited

U.S. PATENT DOCUMENTS

| | | |
|---|---|---|
| 6,278,798 B1 | 8/2001 | Rao |
| 6,281,928 B1 | 8/2001 | Umezaki et al. |
| 6,339,426 B1 | 1/2002 | Lui et al. |
| 6,529,202 B2 | 3/2003 | Wu |
| 6,647,139 B1 | 11/2003 | Kunii et al. |
| 6,778,297 B1 | 8/2004 | Fujiwara |
| 6,834,128 B1 | 12/2004 | Altunbasak et al. |
| 6,930,703 B1 | 8/2005 | Hubel et al. |
| 7,031,496 B2 | 4/2006 | Shimano et al. |
| 7,088,460 B2 | 8/2006 | Toyama et al. |
| 7,160,253 B2 | 1/2007 | Nissila |
| 7,403,310 B2 | 7/2008 | Miyagi et al. |
| 7,418,131 B2 | 8/2008 | Wang et al. |
| 7,539,344 B2 | 5/2009 | Eguchi et al. |
| 7,606,439 B2 | 10/2009 | Lefebure et al. |
| 7,695,143 B2 | 4/2010 | Kobayashi |
| 7,720,283 B2 | 5/2010 | Sun et al. |
| 7,746,356 B2 | 6/2010 | Meinders |
| 7,809,587 B2 | 10/2010 | Dorai et al. |
| 8,068,674 B2 | 11/2011 | Goncalves |
| 8,228,323 B2 | 7/2012 | Bandel et al. |
| 8,233,033 B2 | 7/2012 | Aarts et al. |
| 8,285,034 B2 | 10/2012 | Rajaraman et al. |
| 8,688,579 B1 | 4/2014 | Ethington et al. |
| 8,718,405 B2 | 5/2014 | Fujiki et al. |
| 8,879,839 B2 | 11/2014 | Ishida et al. |
| 8,897,565 B1 | 11/2014 | Palm et al. |
| 8,977,075 B2 | 3/2015 | Tytgat |
| 9,053,515 B1 | 6/2015 | Nowak et al. |
| 9,152,860 B2 | 10/2015 | Cervin et al. |
| 9,430,766 B1 | 8/2016 | Kraft |
| 9,674,505 B2 | 6/2017 | Wu et al. |
| 9,779,926 B2 | 10/2017 | Van Berkel et al. |
| 9,817,081 B2 | 11/2017 | Hahn et al. |
| 9,979,296 B2 | 5/2018 | Djenguerian et al. |
| 10,157,331 B1 | 12/2018 | Tang et al. |
| 10,354,159 B2 | 7/2019 | Savvides et al. |
| 10,467,465 B2 | 11/2019 | Shustorovich et al. |
| 10,515,407 B2 | 12/2019 | Amtrup et al. |
| 10,635,712 B2 | 4/2020 | Macciola et al. |
| 10,657,600 B2 | 5/2020 | Macciola et al. |
| 10,664,919 B2 | 5/2020 | Macciola et al. |
| 10,699,146 B2 | 6/2020 | Shustorovich |
| 10,783,613 B2 | 9/2020 | Ma et al. |
| 10,783,615 B2 | 9/2020 | Ma et al. |
| 10,803,350 B2 | 10/2020 | Ma et al. |
| 11,062,163 B2 | 7/2021 | Thrasher et al. |
| 11,062,176 B2 | 7/2021 | Ma et al. |
| 11,087,407 B2 | 8/2021 | Macciola et al. |
| 2001/0043273 A1 | 11/2001 | Herrod et al. |
| 2002/0057838 A1 | 5/2002 | Steger |
| 2002/0188479 A1 | 12/2002 | Renwick et al. |
| 2004/0071311 A1 | 4/2004 | Choi et al. |
| 2004/0202349 A1 | 10/2004 | Erol et al. |
| 2005/0100210 A1 | 5/2005 | Rice et al. |
| 2005/0175243 A1 | 8/2005 | Luo et al. |
| 2005/0207622 A1 | 9/2005 | Haupt et al. |
| 2005/0243378 A1 | 11/2005 | Klein et al. |
| 2005/0243379 A1 | 11/2005 | Klein et al. |
| 2005/0244035 A1 | 11/2005 | Klein et al. |
| 2006/0017959 A1 | 1/2006 | Downer et al. |
| 2006/0020630 A1 | 1/2006 | Stager et al. |
| 2006/0029276 A1 | 2/2006 | Nagahashi et al. |
| 2006/0043264 A1 | 3/2006 | Sakurai |
| 2006/0210164 A1 | 9/2006 | Hideyuki |
| 2007/0058856 A1* | 3/2007 | Boregowda .......... G06K 9/3258 382/159 |
| 2007/0094296 A1 | 4/2007 | Peters |
| 2007/0110417 A1 | 5/2007 | Itokawa |
| 2007/0237425 A1 | 10/2007 | Taguchi et al. |
| 2008/0013836 A1 | 1/2008 | Nakamura et al. |
| 2008/0031514 A1 | 2/2008 | Kakinami |
| 2008/0177764 A1 | 7/2008 | Kise et al. |
| 2008/0192991 A1 | 8/2008 | Gremse et al. |
| 2008/0278599 A1 | 11/2008 | Shiohara |
| 2009/0043782 A1 | 2/2009 | Otake et al. |
| 2009/0080738 A1 | 3/2009 | Zur et al. |
| 2009/0141940 A1 | 6/2009 | Zhao et al. |
| 2009/0263025 A1* | 10/2009 | Li ........................ G06K 9/522 382/203 |
| 2010/0189367 A1 | 7/2010 | van der Merwe et al. |
| 2010/0289797 A1 | 11/2010 | Tateno et al. |
| 2011/0116684 A1 | 5/2011 | Coffman et al. |
| 2011/0123120 A1 | 5/2011 | Quack |
| 2011/0128360 A1 | 6/2011 | Hatzav et al. |
| 2011/0142341 A1 | 6/2011 | Dolan et al. |
| 2011/0175984 A1 | 7/2011 | Tolstaya et al. |
| 2011/0178708 A1 | 7/2011 | Zhang et al. |
| 2011/0179289 A1 | 7/2011 | Guenther |
| 2011/0254942 A1 | 10/2011 | Suzuki |
| 2011/0312374 A1 | 12/2011 | Chen et al. |
| 2012/0002057 A1 | 1/2012 | Kakinami |
| 2012/0011142 A1 | 1/2012 | Baheti et al. |
| 2012/0051628 A1 | 3/2012 | Noguchi et al. |
| 2012/0070088 A1 | 3/2012 | Yoshimi |
| 2012/0087552 A1 | 4/2012 | Lee |
| 2012/0274991 A1 | 11/2012 | Roy et al. |
| 2012/0281077 A1 | 11/2012 | Morales et al. |
| 2013/0044186 A1 | 2/2013 | Jin et al. |
| 2013/0051671 A1 | 2/2013 | Barton |
| 2013/0063788 A1 | 3/2013 | Iwayama et al. |
| 2013/0129248 A1 | 5/2013 | Doublet et al. |
| 2013/0155058 A1 | 6/2013 | Golparvar-Fard et al. |
| 2013/0155474 A1 | 6/2013 | Roach et al. |
| 2013/0215480 A1 | 8/2013 | Iwayama et al. |
| 2013/0216094 A1 | 8/2013 | DeLean |
| 2013/0272607 A1* | 10/2013 | Chattopadhyay ........ G06K 9/38 382/171 |
| 2014/0003717 A1 | 1/2014 | Brito et al. |
| 2014/0020005 A1 | 1/2014 | Amselem et al. |
| 2014/0072219 A1* | 3/2014 | Tian ..................... G06K 9/346 382/171 |
| 2014/0086488 A1 | 3/2014 | Moteki et al. |
| 2014/0204204 A1 | 7/2014 | Sumiyoshi et al. |
| 2014/0237429 A1 | 8/2014 | Abrahami et al. |
| 2014/0324648 A1 | 10/2014 | Mori et al. |
| 2015/0030227 A1 | 1/2015 | Liang et al. |
| 2015/0146989 A1 | 5/2015 | Shiiyama et al. |
| 2016/0112645 A1 | 4/2016 | Amtrup et al. |
| 2016/0182805 A1 | 6/2016 | Emmett et al. |
| 2016/0210507 A1 | 7/2016 | Abdollahian |
| 2016/0227181 A1 | 8/2016 | Ilic et al. |
| 2017/0147900 A1* | 5/2017 | Booth ...................... G06T 7/11 |
| 2019/0034734 A1 | 1/2019 | Yen et al. |
| 2019/0130583 A1 | 5/2019 | Chen et al. |

(56) References Cited

U.S. PATENT DOCUMENTS

| | | | |
|---|---|---|---|
| 2019/0347485 A1 | 11/2019 | Yang et al. |
| 2020/0219202 A1 | 7/2020 | Macciola et al. |
| 2020/0380643 A1 | 12/2020 | Ma et al. |
| 2020/0394452 A1 | 12/2020 | Ma et al. |
| 2020/0394453 A1 | 12/2020 | Ma et al. |
| 2020/0394763 A1 | 12/2020 | Ma et al. |
| 2021/0027431 A1 | 1/2021 | Ma et al. |
| 2021/0383150 A1 | 12/2021 | Thrasher et al. |
| 2021/0383163 A1 | 12/2021 | Ma et al. |

OTHER PUBLICATIONS

Non-Final Office Action from U.S. Appl. No. 16/194,201, dated Feb. 3, 2020.
Pinto et al., "Why is real-World Visual Object Recognition Hard?" PLoS Computational Biology, Jan. 2008, vol. 4, No. 1, pp. 0151-0156.
Lowe, D., "Object Recognition from Local Scale-Invariant Features," Proceedings of the International Conference on Computer Vision, Sep. 1999, pp. 1-8.
Final Office Action from U.S. Appl. No. 15/394,731, dated Feb. 12, 2020.
Non-Final Office Action from U.S. Appl. No. 16/151,090, dated Feb. 12, 2020.
Lee et al., "Extraction and Integration of Window in a 3D Building Model from Ground View images," IEEE Computer Society Conference on Computer Vision and Pattern Recognition, 2004, 8 pages.
Notice of Allowance from U.S. Appl. No. 16/151,090, dated Jun. 4, 2020.
Notice of Allowance from U.S. Appl. No. 16/267,205, dated Jun. 19, 2020.
Corrected Notice of Allowance from U.S. Appl. No. 16/151,090, dated Jul. 22, 2020.
Ma et al., U.S. Appl. No. 16/997,800, filed Aug. 19, 2020.
Non-Final Office Action from U.S. Appl. No. 16/206,912, dated Aug. 18, 2020.
Examination Report from European Application No. 14861942.2, dated Jun. 3, 2020.
Non-Final Office Action from U.S. Appl. No. 16/824,518, dated Sep. 3, 2020.
Corrected Notice of Allowance from U.S. Appl. No. 16/151,090, dated Aug. 28, 2020.
Corrected Notice of Allowance from U.S. Appl. No. 16/194,201, dated Aug. 28, 2020.
Ma et al., U.S. Appl. No. 17/005,147, filed Aug. 27, 2020.
Ma et al., U.S. Appl. No. 17/005,171, filed Aug. 27, 2020.
Notice of Allowance from U.S. Appl. No. 16/206,926, dated Sep. 8, 2020.
Ma et al., U.S. Appl. No. 17/006,636, filed Aug. 28, 2020.
Ma et al., U.S. Appl. No. 17/006,650, filed Aug. 28, 2020.
Non-Final Office Action from U.S. Appl. No. 15/672,200, dated Feb. 21, 2020.
Final Office Action from U.S. Appl. No. 16/267,205, dated Feb. 24, 2020.
Examination Report from European Application No. 14861942.2, dated Oct. 1, 2019.
Notice of Allowance from U.S. Appl. No. 16/052,495, dated Mar. 18, 2020.
Macciola et al., U.S. Appl. No. 16/824,518, filed Mar. 19, 2020.
Notice of Allowance from U.S. Appl. No. 15/339,789, dated Apr. 7, 2020.
Notice of Allowance from U.S. Appl. No. 15/394,726, dated Apr. 16, 2020.
Notice of Allowance from U.S. Appl. No. 15/672,200, dated Apr. 17, 2020.
Final Office Action from U.S. Appl. No. 15/339,789, dated Oct. 28, 2019.
Notice of Allowance from U.S. Appl. No. 15/394,739, dated Oct. 31, 2019.
Final Office Action from U.S. Appl. No. 15/672,200, dated Oct. 24, 2019.
Advisory Action from U.S. Appl. No. 15/051,587, dated Apr. 29, 2020.
Examiner's Answer to Appeal Brief from U.S. Appl. No. 15/396,306, dated May 15, 2020.
Notice of Allowance from U.S. Appl. No. 16/194,201, dated May 19, 2020.
Notice of Allowance from U.S. Appl. No. 16/206,926, dated May 21, 2020.
Non-Final Office Action from U.S. Appl. No. 15/394,731, dated May 29, 2020.
Non-Final Office Action from U.S. Appl. No. 15/051,587, dated Jul. 31, 2019.
Corrected Notice of Allowance from U.S. Appl. No. 15/396,327, dated Aug. 28, 2019.
Examination Report from European Application No. 14 792 188.6, dated Aug. 20, 2019.
Non-Final Office Action from U.S. Appl. No. 15/394,731, dated Sep. 5, 2019.
Notice of Allowance from U.S. Appl. No. 15/396,327, dated Sep. 24, 2019.
Restriction Requirement from U.S. Appl. No. 16/151,090, dated Nov. 25, 2019.
Notice of Allowance from U.S. Appl. No. 16/052,495, dated Dec. 18, 2019.
Notice of Allowance from U.S. Appl. No. 15/394,726, dated Jan. 8, 2020.
Notice of Allowance from U.S. Appl. No. 15/339,789, dated Jan. 16, 2020.
Final Office Action from U.S. Appl. No. 15/396,306, dated Sep. 17, 2019.
Final Office Action from U.S. Appl. No. 15/394,726, dated Oct. 11, 2019.
Non-Final Office Action from U.S. Appl. No. 16/267,205, dated Oct. 17, 2019.
Final Office Action from U.S. Appl. No. 16/824,518, dated Feb. 23, 2021.
Notice of Allowance from U.S. Appl. No. 16/267,205, dated Oct. 15, 2020.
Notice of Allowance from U.S. Appl. No. 16/206,912, dated Nov. 16, 2020.
Final Office Action from U.S. Appl. No. 15/394,731, dated Dec. 21, 2020.
Examination Report from European Application No. 20194730.6, dated Dec. 11, 2020.
Notice of Allowance from U.S. Appl. No. 16/267,205, dated Mar. 12, 2021.
Notice of Allowance from U.S. Appl. No. 16/206,912, dated Mar. 8, 2021.
Supplemental Notice of Allowance from U.S. Appl. No. 16/206,912, dated Mar. 17, 2021.
Notice of Allowance from U.S. Appl. No. 16/824,518, dated Jun. 1, 2021.
Supplemental Notice of Allowance from U.S. Appl. No. 16/206,912, dated May 28, 2021.
Supplemental Notice of Allowance from U.S. Appl. No. 16/267,205, dated Jun. 9, 2021.
Thrasher et al., U.S. Appl. No. 17/348,584, filed Jun. 15, 2021.
Ma et al., U.S. Appl. No. 17/348,617, filed Jun. 15, 2021.
Supplemental Notice of Allowance from U.S. Appl. No. 16/824,518, dated Jul. 15, 2021.
Non-Final Office Action from U.S. Appl. No. 15/394,731, dated Aug. 16, 2021.
Phillips, P., "Support Vector Machines Applied to Face Recognition," Advances in Neural Information Processing Systems, 1998, pp. 803-809, retrieved from https://papers.nips.cc/paper/1998/file/a2cc63e065705fe938a4dda49092966f-Paper.pdf.
Kung et al., "Biometric Authentication: A Machine Learning Approach," Matlab Projects, Chapter 1, 2004, 13 pages.

(56) References Cited

OTHER PUBLICATIONS

Zhao et al., "Face Recognition: A Literature Survey," ACM Computing Surveys, vol. 35, No. 4, Dec. 2003, pp. 399-458.
Turk et al., "Face Recognition Using Eigenfaces," IEEE Computer Society Conference on Computer Vision and Pattern Recognition, 1991, pp. 586-591.
Joachims, T., "Transductive Inference for Text Classification Using Support Vector Machines," International Conference on Machine Learning, 1999, 10 pages, retrieved from https://www.cs.cornell.edu/people/tj/publications/ioachims_99c.pdf.
Patent Board Decision on Appeal from U.S. Appl. No. 15/396,306, dated Oct. 29, 2021.
Non-Final Office Action from U.S. Appl. No. 16/997,800, dated Nov. 9, 2021.
Kim et al., "Document Capturing Method with a Camera using Robust Feature Points Detection," International Conference on Digital Image Computing: Techniques and Applications, IEEE, 2011, pp. 678-682.
Bulatov et al., "Smart IDReader: Document Recognition in Video Stream," 14th IAPR International Conference on Document Analysis and Recognition, 2017, pp. 39-44.
Liang et al., "Camera-based analysis of text and documents: a survey," Digital Object Identifier, International Journal an Document Analysis and Recognition, 2005, pp. 84-104.
Notice of Allowance from U.S. Appl. No. 15/394,731, dated Dec. 27, 2021.

* cited by examiner

320

RANGE AND/OR POLARITY-BASED THRESHOLDING FOR IMPROVED DATA EXTRACTION

FIELD OF INVENTION

The present invention relates to image capture and image processing. In particular, the present invention relates to capturing and processing digital images using a mobile device, and extracting data from the processed digital image using a recognition-guided thresholding and extraction process.

RELATED APPLICATIONS

This application is related to U.S. Provisional Patent Application No. 62/194,783, filed Jul. 20, 2015; U.S. Pat. No. 9,058,515, filed Mar. 19, 2014; U.S. Pat. No. 8,885,229, filed May 2, 2014; U.S. Pat. No. 8,855,375, filed Jan. 11, 2013; U.S. Pat. No. 8,345,981, filed Feb. 10, 2009; U.S. Pat. No. 9,355,312, filed Mar. 13, 2013; and U.S. Pat. No. 9,311,531, filed Mar. 13, 2014; each of which is herein incorporated by reference in its entirety.

BACKGROUND OF THE INVENTION

Digital images having depicted therein an object inclusive of documents such as a letter, a check, a bill, an invoice, etc. have conventionally been captured and processed using a scanner or multifunction peripheral (MFP) coupled to a computer workstation such as a laptop or desktop computer. Methods and systems capable of performing such capture and processing are well known in the art and well adapted to the tasks for which they are employed.

More recently, the conventional scanner-based and MFP-based image capture and processing applications have shifted toward mobile platforms, e.g. as described in the related patent applications noted above with respect to capturing and processing images using mobile devices (U.S. Pat. No. 8,855,375), classifying objects depicted in images captured using mobile devices (U.S. Pat. No. 9,355,312, e.g. at column 9, line 9-column 15, line 28), and extracting data from images captured using mobile devices (U.S. Pat. No. 9,311,531, e.g. at column 18, line 25-column 27, line 16).

While these capture, processing, classification and extraction engines and methods are capable of reliably extracting information from certain objects or images, it is not possible to dynamically extract information from other objects, particularly objects characterized by a relatively complex background, and/or overlapping regions of foreground (e.g. text) and background. In practice, while it may be possible to reliably extract information from a simple document having a plain white background with dark foreground text and/or images imposed thereon, it is not currently possible to reliably extract information from a document with a more complex background, e.g. a document depicting one or more graphics (such as pictures, logos, etc.) as the background with foreground text and/or images imposed thereon, especially if overlapping so as to create a "dual background" with portions lighter than the foreground element and portions darker than the foreground element.

This problem arises primarily because it becomes significantly difficult to distinguish the foreground from the background, especially in view of the fact that digital images are conventionally converted to bitonal (black/white) or grayscale color depth prior to attempting extraction. As a result, tonal differences between background and foreground are suppressed in converting the color channel information into grayscale intensity information or bitonal information.

This is an undesirable limitation that restricts users from using powerful extraction technology on an increasingly diverse array of documents encountered in the modern world and which are useful or necessary to complete various mobile device-mediated transactions or business processes.

For example, it is common for financial documents such as checks, credit cards, etc. to include graphics, photographs, or other imagery and/or color schemes as background upon which important financial information are displayed. The font and color of the foreground financial information may also vary from "standard" business fonts and/or colors, creating additional likelihood that discriminating between the foreground and background will be difficult or impossible.

Similarly, identifying documents such as driver's licenses, passports, employee identification, etc. frequently depict watermarks, holograms, logos, seals, pictures, etc. over which important identifying information may be superimposed in the foreground. To the extent these background and foreground elements overlap, difficulties are introduced into the discrimination process, frustrating or defeating the ability to extract those important elements of information.

Similarly, many documents depict text or other elements of interest according to different "polarizations" or using different "polarity." While the most common polarity involves representing dark foreground elements (e.g. text, logo, symbol, picture, etc.) on a bright/light background, it is increasingly common to also use an inverse polarity, in which bright/light foreground elements are represented on a dark background, all within the same document. Worse still, some images may contain elements of interest that are significantly similar to the background upon which the elements are superimposed with respect to grayness intensity and/or color.

Conventional extraction techniques rely on suppressing color depth, typically to the point of binary image data, meaning it is not currently possible to reliably extract information represented according to different polarities. The conventional color suppression process essentially maps particular color channel values (or combinations thereof) to corresponding shades of gray.

Conventionally, binarization includes defining a threshold intensity value and assigns one binary pixel value (e.g. 0) to pixels with an intensity below the threshold, and the other binary pixel value (e.g. 1) to pixels with an intensity above the threshold. This results in a black/white bitonal image, and may be accomplished using a single, global binarization threshold applied to the entire image, or in more advanced cases by evaluating a portion of the image, and defining a local threshold configured to take into account the distribution of grayness within the evaluated portion of the image (also known as adaptive thresholding).

In both cases, the mapping of color/grayscale values proceeds according to a single convention that emphasizes information characterized by intensity values on one end of the intensity spectrum (typically darker elements), while suppressing information characterized by intensity values on the other end of the intensity spectrum (typically brighter or more "white" elements). Accordingly, it is not possible to reliably identify and/or extract all the information from the binarized image. Indeed, it is often impossible to retrieve information represented according to at least one of the polarizations (typically light foreground elements on dark background) using conventional approaches.

Therefore, it would be highly beneficial to provide new techniques, systems and/or computer program product technology for identifying regions of a digital image depicting elements of interest, particularly text, especially where such elements of interest are represented according to different polarities/polarizations. It is also desirable to improve recall and accuracy of extracting information from such images.

SUMMARY

In accordance with one embodiment, a computer program product includes a computer readable storage medium having embodied thereon computer readable program instructions. The computer readable program instructions are configured, upon execution thereof, to: render a digital image using a plurality of binarization thresholds to generate a plurality of binarized digital images, wherein at least some of the binarized digital images are generated using one or more binarization thresholds that are determined based on a priori knowledge regarding an object depicted in the digital image; identify one or more connected components within the plurality of binarized digital images; and identify one or more text regions within the digital image based on some or all of the connected components.

In accordance with another embodiment, a computer-implemented method includes: rendering, using a processor, a digital image using a plurality of binarization thresholds to generate a plurality of range-binarized digital images, wherein each rendering of the digital image is generated using a different combination of the plurality of binarization thresholds, and wherein each combination of the plurality of binarization thresholds includes a unique upper threshold and a unique lower threshold; identifying, using the processor, one or more range connected components within the plurality of range-binarized digital images; and identifying, using the processor, one or more text regions within the digital image based on some or all of the range connected components.

In still yet another embodiment, a server system includes a processor and logic. The logic is integrated with and/or executable by the processor to cause the processor to: render a digital image using a plurality of binarization thresholds to generate a plurality of range-binarized digital images, wherein each rendering of the digital image is generated using a different combination of the plurality of binarization thresholds, and wherein each combination of the plurality of binarization thresholds includes a unique upper threshold and a unique lower threshold; identify one or more range connected components within the plurality of range-binarized digital images; and identify a one or more text regions within the digital image based on some or all of the range connected components identified within the plurality of range-binarized digital images.

Other aspects and embodiments of the present invention will become apparent from the following detailed description, which, when taken in conjunction with the drawings, illustrate by way of example the principles of the invention.

DETAILED DESCRIPTION

Figure 1:
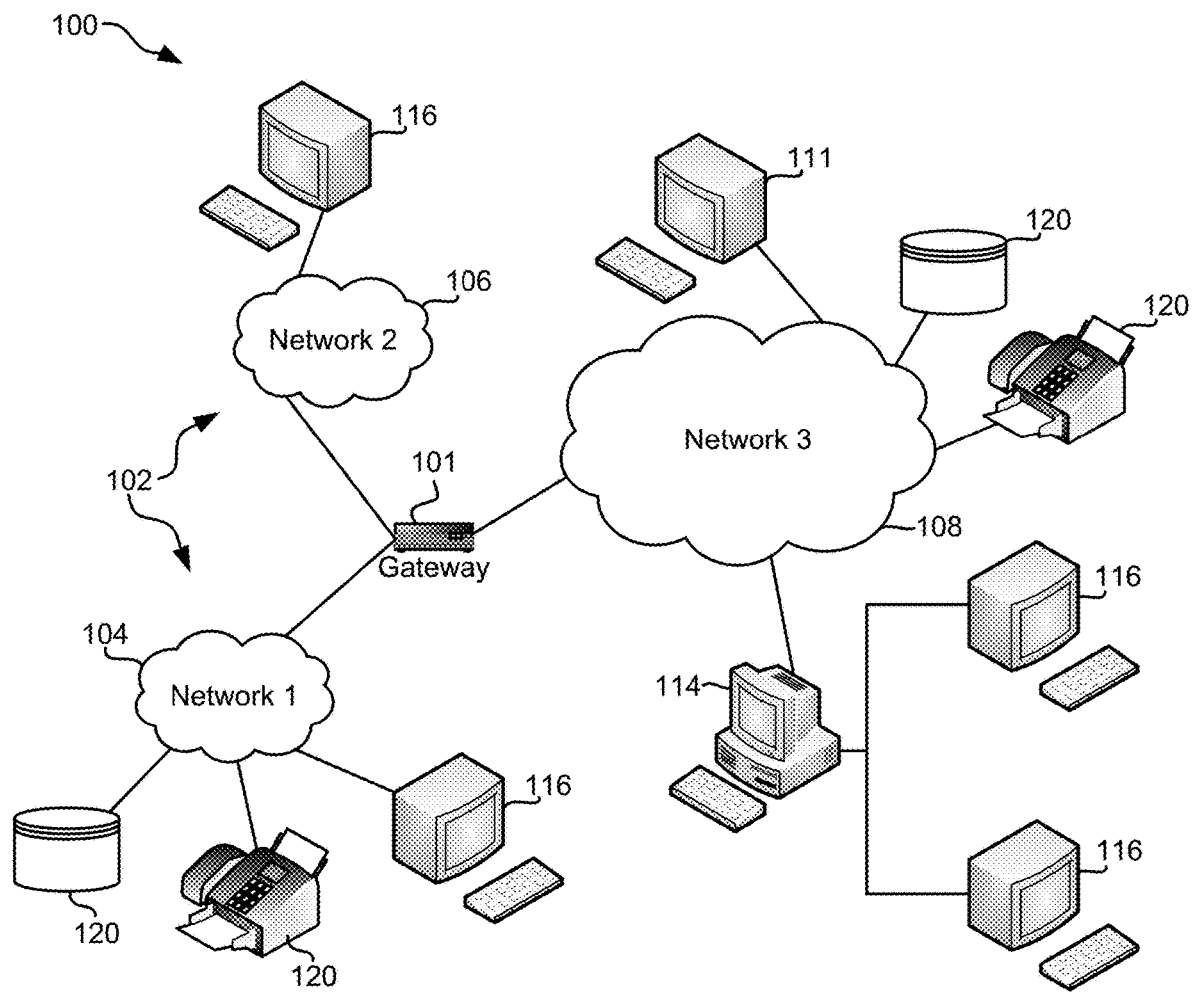
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As referred-to herein, it should be understood that the term "connected component" refers to any structure within a bitonal image that is formed from a contiguous set of adjacent pixels. For example connected components may include lines (e.g. part of a document's structure such as field boundaries in a form), graphical elements (e.g. photographs, logos, illustrations, unique markings, etc.), text (e.g. characters, symbols, handwriting, etc.) or any other feature depicted in a bitonal image. Accordingly, in one embodiment a connected component may be defined within a bitonal image according to the location of the various pixels from which the component is formed.

The term "image feature" is to be understood as inclusive of connected components, but also includes such components as may be defined within color spaces other than a bitonal image. Thus, an image feature includes any structure of an image that is formed from a contiguous set of adjacent pixels. The image feature may be defined according to the location of constituent pixels as noted above for connected components, but may also include other information such as intensity information (e.g. in one or more color channels).

The present application refers to image processing, and addresses the problems associated with attempting to threshold and extract information, particularly textual information, from images in which the information are depicted according to different polarities, and/or in which the information have image characteristics significantly similar to a background upon which the information are superimposed in the image. The presently disclosed inventive concepts are particularly well suited for identifying elements of interest, e.g. text characters, within the digital image regardless of polarity and in situations where a priori information regarding the location of text may be unavailable.

In accordance with one general embodiment, a computer program product includes a computer readable storage medium having embodied thereon computer readable program instructions. The computer readable program instructions are configured, upon execution thereof, to cause a mobile device to perform operations inclusive of: rendering, using a processor of the mobile device, a digital image using a plurality of binarization thresholds to generate a plurality of range-binarized digital images, wherein each rendering of the digital image is generated using a different combination of the plurality of binarization thresholds; identifying, using the processor of the mobile device, one or more range connected components within the plurality of range-binarized digital images; and identifying, using the processor of the mobile device, a plurality of text regions within the digital image based on some or all of the range connected components.

In accordance with another general embodiment, a computer-implemented method includes: rendering, using a processor of a mobile device, a digital image using a plurality of binarization thresholds to generate a plurality of range-binarized digital images, wherein each rendering of the digital image is generated using a different combination of the plurality of binarization thresholds; identifying, using the processor of the mobile device, one or more range connected components within the plurality of range-binarized digital images; and identifying, using the processor of the mobile device, a plurality of text regions within the digital image based on some or all of the range connected components.

In still yet another general embodiment, a server system includes a processor and logic. The logic is integrated with and/or executable by the processor to cause the processor to perform image processing operations including, but not limited to: rendering, using the processor, a digital image using a plurality of binarization thresholds to generate a plurality of range-binarized digital images, wherein each rendering of the digital image is generated using a different combination of the plurality of binarization thresholds; identifying, using the processor, one or more range connected components within the plurality of range-binarized digital images; and identifying, using the processor, a plurality of text regions within the digital image based on some or all of the range connected components.

General Mobile Networking and Computing Concepts

As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
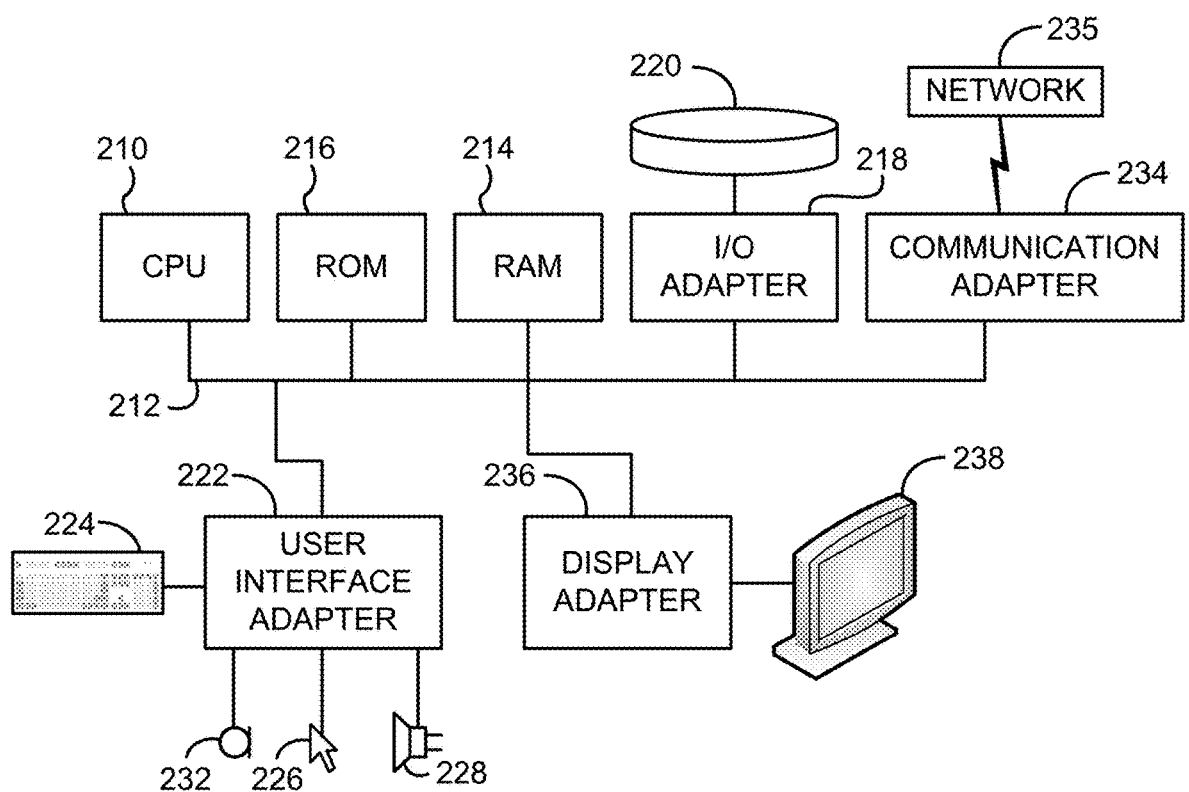
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. Patents, Patent Publications, and/or Patent Applications incorporated herein by reference. For example, digital images suitable for processing according to the presently disclosed algorithms may be subjected to image processing operations, such as page detection, rectangularization, detection of uneven illumination, illumination normalization, resolution estimation, blur detection, classification, data extraction, etc.

In more approaches, the presently disclosed methods, systems, and/or computer program products may be utilized with, implemented in, and/or include one or more user interfaces configured to facilitate performing any functionality disclosed herein and/or in the aforementioned related patent applications, publications, and/or patents, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related patent applications, publications, and/or patents, among others that would be appreciated by one having ordinary skill in the art upon reading these descriptions.

It will further be appreciated that embodiments presented herein may be provided in the form of a service deployed on behalf of a customer to offer service on demand Iterative Recognition-Guided Thresholding In general, the presently disclosed inventive concepts encompass the notion of performing a recognition-guided thresholding and extraction process on a digital image to maximize the quality of the processed image (preferentially a binarized image, since a great number of OCR engines rely on binary images as input) for subsequent extraction of information therefrom. Notably, employing the presently disclosed inventive techniques significantly improves recall rate of elements of interest, particularly text characters, symbols, etc. via identification of connected components according to different polarizations of the digital image.

Accordingly, the presently disclosed inventive concepts include performing recognition-guided thresholding on a digital image to identify elements of interest within the digital image. The techniques described herein may leverage the features set forth in U.S. patent application Ser. No. 15/214,351, to Thrasher, et al., filed Jul. 19, 2016 and entitled "Iterative, Recognition-Guided Thresholding and Data Extraction," the teachings of which are herein incorporated by reference. Notably, the techniques described in the aforementioned patent application are distinct from those described herein in that the presently disclosed inventive concepts are configured to identify and facilitate extraction of elements of interest whose location within the digital image is unknown, while the previously disclosed techniques of the '351 application are configured to improve recognition and extraction of elements of interest along a single dimension, within a predefined region of the digital image known a priori to include elements of interest based on learn-by-example training.

As noted in the '351 application abstract, the iterative recognition-guided thresholding approach described therein achieves such benefits by enabling the identification, recognition, and extraction of elements on a per-element, e.g. per connected component, basis. Individually or independently binarized portions of a location within the digital image may be synthesized or assembled into a contiguous result, allowing the optimal representation of each connected component to be used in forming a contiguous result.

In accordance with various embodiments of the presently described inventive techniques, systems, and products, the benefit is improved recognition of characters and other elements of interest such as symbols, regardless of polarity of such elements of interest as represented in an original image, typically a color image.

It should be noted that the presently disclosed inventive concepts may be employed in combination with the concepts described in the '351 patent application. For instance, and without limitation, the presently disclosed inventive techniques, systems, and computer program products may include features such as: (1) thresholding on a per-region and/or per-component basis; (2) recognition of connected components based on optical character recognition (OCR) and associated confidence measures, recognition of connected components based on learn-by-example training to identify image features and associated confidence measures, and/or recognition based on other expectation-based confidence measures and techniques; (3) color normalization; (4) aggregation/assembly of binarization results for individual components into a contiguous result; (5) validation; (6) data extraction, etc. as described in further detail in the '351 patent application.

In various embodiments, it is particularly useful to leverage the individual advantages conferred by the presently disclosed inventive concepts and those described in the '351 patent application in order to greatly improve recall rate of elements of interest from digital images. This is especially advantageous for thresholding, recognizing, and extracting information from digital images depicting elements of interest superimposed on complex background textures (e.g. pictures, geometric patterns, holograms, etc.); where elements of interest are superimposed on a background exhibiting substantially similar color and/or intensity characteristics as the elements of interest (e.g. where elements of interest and background are each different shades of a same or very similar color such as light grey on dark grey, aqua on blue, magenta on red, etc. as would be understood by a person having ordinary skill in the art upon reading the present disclosures); and/or where elements of interest are represented according to two or more different polarities within the digital image (e.g. dark foreground on bright/light background, and bright/light foreground on dark background).

Figure 3A:
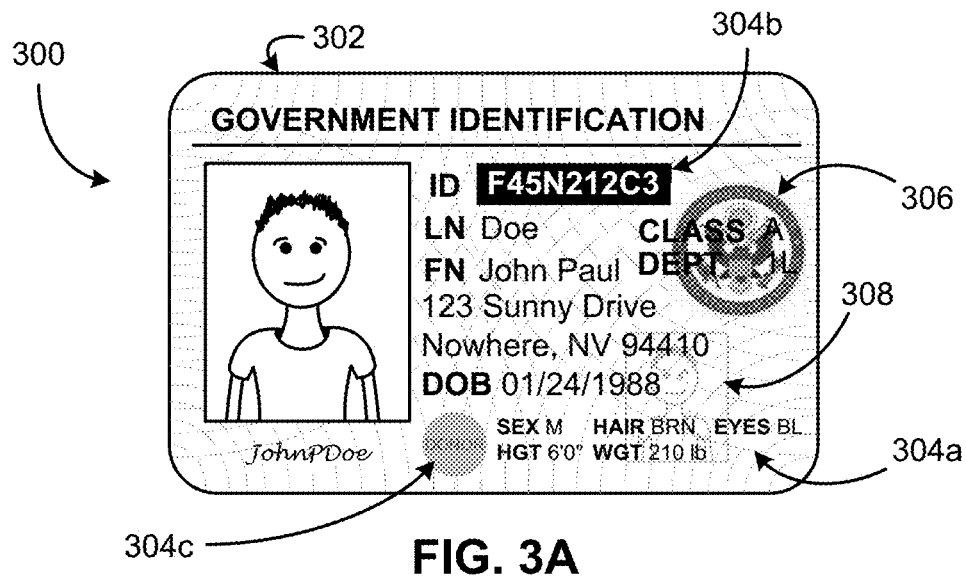
FIG. 3A shows a simplified schematic of an identification document having elements of interest superimposed on complex backgrounds, as well as elements of interest depicted according to different polarities and elements of interest depicted on a background having significantly similar intensity and/or color characteristics, according to one embodiment.

Turning now to FIG. 3A, an exemplary simplified schematic of an identification document (ID) 300 is shown. The ID 300 is characterized by a complex background having foreground elements superimposed thereon. For instance, the complex background includes overlapping patterns of curved lines 302, a seal 306, and a faded representation of a picture 308 of the individual to which the ID belongs (bottom right, appearing beneath address, date of birth and bio information). Of course, as would be understood by persons having ordinary skill in the art upon reading the instant disclosure, the complex background may include other similar features or patterns, such as drawings, pictures, holograms, logos, etc. without departing from the scope of the present disclosure.

Superimposed on such complex background features of the ID 300 are a plurality of foreground elements, which include textual information 304a, 304b depicted according to different polarities, as well as textual information characterized by a significantly similar color/gray intensity profile as a background element upon which the textual information 304c is superimposed. More specifically, textual information 304a including the name, address, class, department, date of birth, signature, and bio information (sex, height, weight, hair and eye color) are depicted according to a common polarity in which dark text (symbols, markings, etc.) are depicted on a relatively light or bright background. Conversely, textual information 304b including the ID number are depicted according to an opposite polarity, i.e. bright or light text on a relatively dark background.

Textual information 304c, on the other hand, is characterized by the foreground and background elements (as shown in FIG. 3A, the word "DONOR" and the corresponding circle upon which the word is superimposed) having substantially similar color and/or intensity characteristics such that both foreground and background are difficult to distinguish from one another via thresholding. Although the textual information 304c as shown in FIG. 3A and corresponding background element are characterized by relatively intermediate color/gray intensity values, in other embodiments textual information 304c may include dark foreground and background elements, bright/light foreground on bright/light background elements, or any combination of similar color/gray intensity characteristics therebetween.

As understood herein, foreground elements such as textual information or other elements of interest (e.g. including image features) and corresponding background elements/textures/regions, etc. may be considered "polarized" or have a "polarity" when there is a significant difference in intensity between the foreground element and corresponding background element/texture/region, etc. The difference may be present according to a grayscale "brightness" or "intensity" scale (e.g. 0-255), and/or in one or more color channel intensity scales (e.g. RGB, CMYK, Luv, etc. in various approaches). A significant difference is characterized by a difference in intensity on the corresponding scale of intensity values (e.g. 0-255 for grayscale or for each channel in a RGB image) that is sufficient for the human visual system to distinguish foreground from background, and may vary, according to one embodiment, from differences in intensity values of about 5-10 for very bright backgrounds (e.g. background textures comprising pixels characterized by intensity values of about 230 or more); and about 20-30 for darker backgrounds (e.g. background textures comprising pixels characterized by intensity values of about 100 or less).

As described in further detail below, and as represented particularly in FIG. 3A, the presently disclosed inventive concepts are particularly configured to improve the recognition and extraction of elements of interest such as text, image features, etc. having known characteristics (e.g. geometric characteristics such as size, stroke thickness, etc.; color characteristics, etc.).

Skilled artisans will appreciate that in a typical extraction process where an image is rendered into a bitonal representation and information is identified using the bitonal representation is difficult or impossible when the information of interest is difficult to discern from background or other information (which may not be of interest, such as text appearing in a background element like the words represented in seal 306 of FIG. 3A). This is in part because the thresholding process generally produces "blotches" of black on white, and where foreground and background elements having similar intensity characteristics overlap, this makes discerning foreground from background difficult in the resulting bitonal representation.

With reference to FIG. 3A, for example, much of the textual information 304a is superimposed on one or more of the lines 302 of the background pattern, and both the lines 302 and textual information 304a are relatively dark (e.g. compared to the ID background). Accordingly, conventional edge-based binarization of a digital image of the ID is likely to generate characters with overlapping/intersecting/obfuscating lines, which generally depresses recall rate because the character identity cannot be recognized from the bitonal representation.

As will be further appreciated by a skilled artisan upon reading the present disclosure, binarization preferably defines a thresholding value that resides between the intensity of the information to be extracted and other elements within the image (foreground, background or otherwise, but particularly background elements). This ideal scenario separates the information of interest from the undesired information, and allows significant recall of the desired information. However, where information is represented within a single image with zones of different backgrounds and/or different polarities, the threshold value that is "ideal" for one zone may exclude from the bitonal representation information in another zone. For example, if the background of the image is uniform gray and in one zone text is black while in another text is white, the respective threshold values that are "ideal" for these different zones are different, and may be significantly so.

For instance, and again with reference to FIG. 3A, defining a threshold that would effectively separate textual information 304a from ID background and background elements such as seal 306, picture 308 and lines 302 would exclude textual information 304b from the bitonal representation because such textual information has intensity and/or color characteristics substantially similar to that of the ID background.

Worse still, it is not possible to resolve the problem simply by using a different threshold closer to the opposite end of the intensity spectrum as used to include textual information 304a in the bitonal representation. Since the textual information 304a is characterized by a dark foreground on light background polarity, a threshold value that distinguishes such textual information 304a from both the ID background and the background elements 302, 306, 308 would be a threshold value that includes elements darker than the background elements and excludes elements lighter than the background and background elements. Defining the threshold near the "darker" end of the intensity/color spectrum may accomplish this result. However, defining the threshold near the opposite end of the spectrum would only include more elements in the bitonal representation, both light and dark. It would not be possible to distinguish the textual information 304b from the surrounding dark background in the resulting bitonal representation—instead the entire field (and at the limit where text is "white", e.g. a grayscale intensity value of 255, the entire image) would appear as a black box.

Those having ordinary skill in the art will appreciate that the foregoing challenges are not unique to IDs such as shown in FIG. 3A, but also appear in other document types. Indeed, the physical documents need not represent elements of interest according to different polarities or intensity levels in order for images thereof to depict elements with apparent polarities or intensity levels. For instance, a glossy document such as a credit card, and/or a document with embossed printing, may reflect light from a capture device and cause certain elements to appear brighter in the digital image than on the physical document. Accordingly, it should be appreciated that the presently disclosed inventive concepts are particularly applicable to images of documents exhibiting elements with different polarity or intensity levels, sometimes because of varying illumination, regardless of the appearance of the corresponding physical document.

Figure 3B:
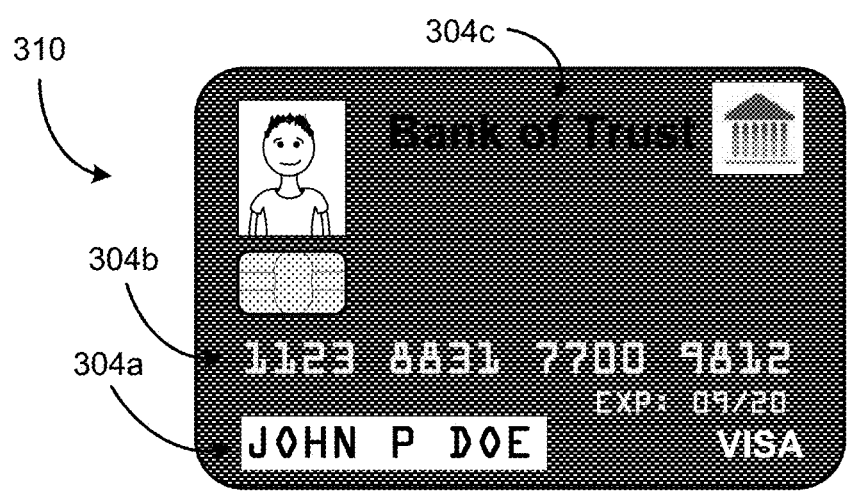
FIG. 3B shows a simplified schematic of a payment document, e.g. a credit or debit card, having elements of interest represented according to different polarities, according to one embodiment.

As shown in FIG. 3B, credit or debit card 310 also includes elements of interest depicted according to different polarities, as well as elements of interest having similar characteristics as the background upon which the elements are superimposed. More specifically, textual information 304a and 304b are depicted according to similarly different polarities as represented in FIG. 3A. Textual information 304c is also similar in that the foreground text is superimposed on a background with similar color and/or intensity characteristics. However in card 310 the background is predominantly dark, as opposed to the predominantly bright background of the ID 300 of FIG. 3A. Regardless, skilled artisans will appreciate that similar challenges set forth above regarding ID 300 are also presented by card 310.

Figure 3C:
FIG. 3C is a photographic representation of a rewards card exhibiting a complex background including elements of interest represented according to different polarities, and elements of interest represented on dual background regions, according to one embodiment.

For instance, and with reference to FIG. 3C, a reward card 320 depicts textual information and demonstrates a scenario in which even individual characters of textual information 304c may be characterized by portions of the individual characters being represented on a dual background such that portions of the character are brighter than local background regions while other portions of the character are darker than local background regions, e.g. the thousands digit of the last block of the rewards card number (i.e. the "2" character in "2789"), the hundreds digit of the first block of the rewards card number (i.e. the "2" character in "6274"), and both the hundreds and thousands digits of the third block of the rewards card number (i.e. the "9" and "0" of "0943") each have lighter portions depicted on a dark background, and light portions depicted on a light background. Attempting to threshold even these individual characters using conventional global or local (e.g. adaptive) thresholding techniques would simply fail to retrieve the character, as the character would be "broken" no matter what single threshold value is chosen in the binarization process. Moreover, adaptive thresholding focuses on edges based on the assumption that edges correspond to transitions between background and characters. However, in situations where a complex background exists, there are so many edges that do not correspond to characters that the assumption breaks down and characters cannot be reliably recovered. The presently disclosed inventive concepts overcome this challenge and enable the recovery of even such complex characters and connected components, particularly via evaluating ranges of differently thresholded image renderings and grouping connected components from each series of renderings and assembling such groupings into a cohesive, aggregate result.

Figure 4:
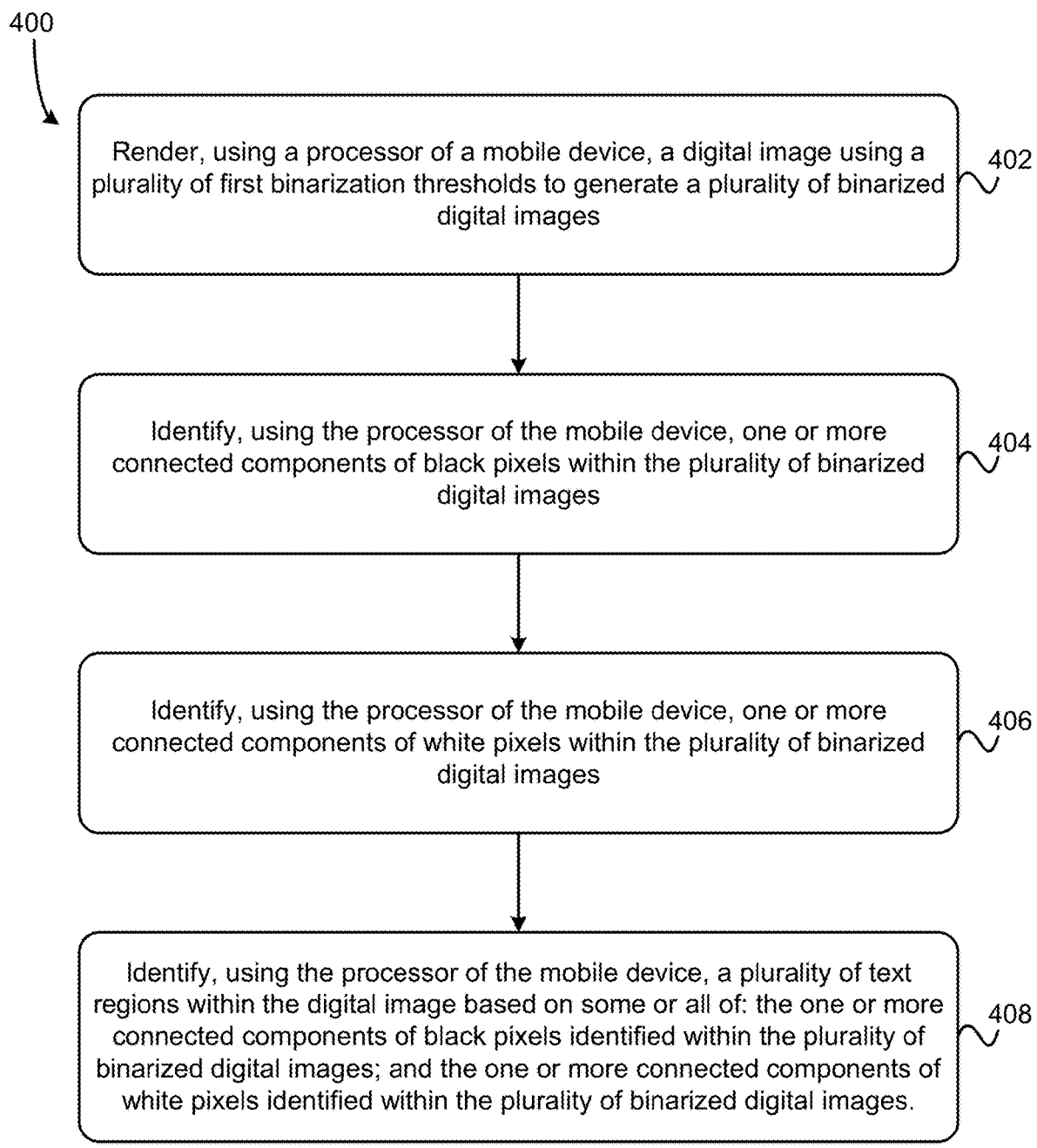
FIG. 4 is a flowchart of a method, according to one embodiment.

To address the foregoing challenges, and in accordance with one exemplary embodiment of the presently disclosed inventive concepts, a novel technique such as represented in method 400 of FIG. 4 may be employed. The method 400 may be performed in accordance with the present invention in any of the environments depicted in FIGS. 1-3C, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor of a mobile device, a processor of a workstation or server environment, some other device having one or more processors therein, or any combination thereof.

The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where, using a processor of a mobile device, a digital image is thresholded using a plurality of binarization thresholds to generate a plurality of binarized digital images. Each rendering of the digital image is generated using a different one of the plurality of binarization thresholds, e.g. a plurality of thresholds each having a different threshold value.

In operation 404, method 400 includes identifying, using the processor of the mobile device, one or more connected components of black pixels within the plurality of these binarized digital images. Preferably, as described hereinabove, the connected components are identified in a manner so as to discriminate elements of interest (most preferably text characters) from elements not of interest (e.g. image features, where text characters are the elements of interest). Connected components may be identified using any suitable technique, but preferably are identified based on the techniques and technology described in the '351 patent application.

With continuing reference to method 400, in operation 406 method 400 includes identifying, using the processor of the mobile device, one or more connected components of white pixels within the plurality of these binarized digital images, which conveys the advantageous ability to recover elements of interest depicted according to the other polarity than the elements of interest that are recoverable from black connected components, i.e. text characters rendered against darker background. The same preferences regarding identification of black connected components above in operation 404 apply to identification of white connected components in operation 406.

In order to detect elements of interest rendered against dual backgrounds (e.g. text characters, in one approach), it is advantageous in some approaches to additionally combine the same binary images generated according to various thresholds that were used to analyze black and white connected components, in order to create derivative, "range-binarized" images in which black pixels correspond to gray levels only within the range between lower and upper threshold. The creation of such derivative images can be achieved using a bit-wise logical operation on the original binary packed images corresponding to the lower threshold and the upper threshold of the range, respectively. In the preferred encoding, the "bits" representing pixels in original images are packed 8 per byte, with 0 indicating "black" and 1 indicating "white." In the original binary corresponding to the lower threshold of the range-binarized image, black bits correspond to "darker" pixels characterized by intensity values below this lower threshold, and white bits correspond to "brighter" pixels characterized by intensity values above the lower threshold. Similarly, in the image corresponding to the upper threshold of the range-binarized image, black bits correspond to "darker" pixels characterized by intensity values below the upper threshold, and white bits correspond to "brighter" pixels characterized by intensity values above the upper threshold. Accordingly, the range-binarized image defines black bits for the pixels corresponding to original pixels characterized by intensity values within the range of the upper and lower thresholds, i.e. those that are white in the first binary image (lower threshold) and black in the second binary image (upper threshold). The connected components found in these "range" images will be referred to herein as "range components" or "range connected components" equivalently.

Method 400 also includes identifying, using the processor of the mobile device, a plurality of text regions within the digital image in operation 408. These text regions are identified based on some or all of: the black and/or white connected components identified within the plurality of binarized digital images in operations 404 and 406.

In some approaches, text regions may be optionally identified further based on range connected components within a plurality of range binarized digital images. In various embodiments, connected components from only a subset of the black, white, and/or range connected components may be utilized to identify the text regions. In preferred approaches, text regions are identified based on a region-growing approach in which geometric characteristics of the connected components are considered to determine likelihood of such components corresponding to elements of interest, as will be described further below.

As noted above, method 400 may generally include any number of additional and/or alternative functions, features, operations, etc. as described and/or referenced herein, without departing from the scope of the inventive concepts. These features are to be understood as optional, modular aspects of the embodiment of the invention represented broadly by FIG. 4 and method 400, and may be employed in any combination or permutation with operations 402-408 without departing from the scope of the inventive embodiment of FIG. 4.

For instance, thresholding may be performed according to two different polarities, e.g. a first thresholding approach targeting dark characters represented on light backgrounds, and a second thresholding approach targeting bright/light characters represented on relatively dark backgrounds. In this approach, method 400 may omit the steps of generating an inverted representation of the native image, and instead thresholding the native image using a plurality of thresholds as generally described above (e.g. a plurality of thresholds on an intensity scale of 0-255, each threshold being characterized by a step of 5-10 units, e.g. 8 units). The series of thresholded images are evaluated using a two-pass procedure to determine presence of connected components therein, according to an exemplary implementation.

In the first pass, pixels having an intensity value below the intensity threshold are included in the set of connected components (assuming such pixels otherwise meet the criteria for being part of a connected component). In the second pass, pixels having an intensity value above the intensity threshold are included in the set of connected components (again assuming all other appropriate criteria are satisfied). In this manner, the first pass identifies connected components that are relatively dark compared to the background upon which the components are represented, while in the second pass connected components that are relatively bright compared to the background upon which the components are represented. Of course, the order of performing each pass may be reversed without departing from the scope of the inventive concepts presented herein.

In another aspect, a plurality of range-binarized digital images may be rendered. As understood herein, creating range-binarized digital images includes generating a binary representation between a first threshold and a (preferably higher) second threshold. Rather than defining pixels above a threshold as "white" and below the threshold as "black" per conventional binarization, generating range-binarized images involves including all pixels having an intensity value within the range of the two thresholds as part of the set of pixels from which to identify connected components.

Accordingly, in one embodiment all pixels having an intensity value within the range of the two thresholds may be defined as black, while all pixels having an intensity value within the range of the two thresholds as white. Of course, pixels within the specified range may be defined as white, and those outside the range as black, in other embodiments. In this manner, the range-binarized images represent a logical OR operation of an inverted binary image obtained by thresholding an inverted image using the first threshold (where black pixels correspond to gray-level values above the first threshold), and the native (non-inverted) image obtained using the second threshold (where black pixels correspond to gray-level values below the second threshold). The OR operation will leave as black only those bits that are black in both images. A plurality of range-binarized images may be rendered using different pairs of thresholds across different ranges of intensity, in various embodiments.

Range-binarized images are particularly useful in cases when the background is so complex that some elements of interest are represented on a dual background including portion(s) thereof darker than a local background adjacent to one side of the element(s) of interest, and other portion(s) brighter than a local background adjacent to another side of the element(s) of interest (e.g. as is the case for a mid-range intensity gray character printed against a black-white checkerboard background).

The dual relative nature of the character and background prevents the use of a single binarization threshold to distinguish the character from the various relatively darker and lighter background portions. Indeed, even using multiple binarization thresholds may be insufficient to identify characters within images having such complex backgrounds. The presently disclosed inventive concepts overcome this challenge by creating range-binarized images from a plurality of binary thresholded images, and identifying elements of interest among connected components defined using the range-binarized images.

Accordingly, embodiments of method 400 may employ range connected components found in range-binarized images alternatively, or in addition to, the pluralities of black and white connected components of the original thresholded binarized images, e.g. as described above regarding method 400 and operations 404-406. Moreover, the range connected components identified within the range-binarized images may be utilized to identify the text regions within the digital image, preferably in conjunction with the black and/or white connected components identified within the pluralities of original thresholded binarized images.

In a particularly preferred embodiment, method 400 may employ a recognition-based approach to facilitate identifying only those connected components which correspond to elements of interest. Accordingly, in one implementation method 400 may include evaluating a confidence of an identity of the connected components identified within the plurality of black pixels in binarized digital images; and evaluating a confidence of an identity of the connected components identified within the plurality of white pixels in binarized digital images.

Preferably, both black and white connected component(s) within the plurality of binarized images are utilized to identify the plurality of text regions within the digital image consisting of connected components having an identity confidence level value above a predefined identity confidence threshold. In other words, connected components having confidence values less than a particular threshold may be excluded from the text region identification process. In any case, for different components with substantially overlapping bounding boxes, the most confident one, or a confident combination of some of them, should be chosen to resolve such conflicts.

It should also be appreciated that connected components identified within the range-binarized images may be evaluated to determine confidence of each connected component's identity, and the connected components identified within the range images that are utilized to identify/define the text regions may be restricted to only those connected components having an identity confidence level value above a predefined identity confidence threshold.

In one embodiment, evaluating confidence may involve submitting connected components to a neural network trained to recognize connected components of various types, and preferably to recognize connected components that represent text characters, as well as determine a likely character identity of such connected components. For instance, a connected component may be submitted to the neural network and a series of different possible identities may be determined, each having an associated confidence in the determination (based, for example, on criteria used to determine component identity and corresponding "fitness" of the particular component under several different hypotheses each corresponding to a different potential identity). The confidence may be represented by a value on a scale from 0 to 1, with 1 indicating complete confidence the component is a particular character, and 0 indicating complete confidence the component is not a particular character. Evaluating confidence of connected component identities may involve comparing the relative confidence of alternative hypotheses regarding the component identity, and in the event a particular hypothesis (preferably the "top" or "best" fit) having a confidence measure with a value of at least 0.2 magnitude greater than an alternative hypothesis (preferably the "second best" fit) may be designated as having sufficient confidence in the particular hypothesis.

Most preferably, performing the method 400 as set forth herein, including recognizing text characters within the plurality of text regions identified within the digital image, may accurately identify an identity of up to 50% of text characters represented within the digital image that would be missed using standard binarization techniques. Put another way, in preferred approaches the error rate may be improved by about 50% relative to the error rate achieved using conventional binarization techniques such as global thresholding, local thresholding, and/or adaptive thresholding.

In one approach, identifying the plurality of text regions within the digital image as described above regarding operation 408 includes: calculating one or more geometric and/or color characteristics of the one or more black and white connected components within the plurality of thresholded binary images, and/or connected components from range-binarized digital images; grouping adjacent of the one or more resulting connected components that exhibit one or more common geometric characteristics; defining each grouping of three or more adjacent connected components that exhibit the one or more common geometric characteristics as a candidate text region; and assembling the candidate text regions.

In this manner, and according to preferred implementations, text regions may be "assembled" from various binarized images, where the various images may depict different portions of individual text regions with different quality/clarity/confidence, and thus individual text regions may be assembled based on the best available information from among the pluralities of binarized images.

Geometric characteristics may include any combination of a connected component baseline, a connected component top line, a connected component height, a connected component stroke thickness, a connected component density, a connected component number of vertical and horizontal crossings, etc.; color characteristics may use color information corresponding to the connected component, the color information being represented in, or derived from, the digital image. In one approach, thresholds used with geometric features like baseline consistency are relative to median component height. These thresholds are chosen empirically, after trial and error.

In preferred approaches, the digital image is a full-color digital image; and the inverted version of the digital image is a full-color digital image. Full-color images should be understood to include information in one or more color channels, regardless of encoding scheme (e.g. RGB, CMYK, Luv, etc.), and may or may not also include a separate (e.g. grayscale "brightness") intensity scale in addition to such color information. However, skilled artisans will appreciate that digital images may be converted to grayscale and binarized versions of the grayscale digital image, and an inverted version thereof, may be generated, without departing from the scope of the presently disclosed inventive concepts.

In one approach, each of the plurality of binarization thresholds is independently characterized by a binarization threshold value in a range from 0-255, particularly where the digital image from which the binarized images are generated is a grayscale image. In preferred embodiments, each of the plurality of binarization thresholds is characterized by a difference between consecutive binarization threshold values in a range from about 5 intensity units to about 10 intensity units.

Most preferably, in one embodiment the binarization thresholds are characterized by a difference (or in the case where the difference is equal among all thresholds, a "step") of about 8 intensity units.

Notably, the plurality of binarization thresholds used to detect black components and the plurality of binarization thresholds used to detect white components may employ identical threshold values, in one embodiment.

In one implementation, the presently disclosed inventive concepts may be employed using a grayscale image as input, and therefore converting color images to grayscale images should be understood as a functionality within the scope of the present disclosures. Any suitable conversion technique that would be appreciated by a skilled artisan upon reading the present descriptions may be employed.

However, in further implementations it may be useful to utilize additional information represented in one or more color channels to improve the thresholding techniques described herein. This is particularly the case for images depicting text on a background texture in which conversion to gray may be useless because the grayscale intensity level of both the foreground and background can be almost indistinguishable, although the color differences are striking. Notably, this additional information from the color of the image may be advantageous to improve thresholding of not only the elements that appear very dark or bright against a relatively bright or dark background, respectively, but also foreground elements such as characters that are depicted in regions with mid-range intensity and/or lack any polarity due to significant similarity in gray intensity between the foreground and background, and/or be depicted on dual backgrounds.

In various embodiments, the black and white components identified within the binarized images may respectively be components that are represented according to different polarities in the digital image. Accordingly, in one embodiment black connected components identified within the plurality of binarized images correspond to text characters represented against lighter background, while white connected components identified within the plurality of binarized images correspond to text characters represented against darker background. Similarly, at least some of the connected components identified within the plurality of range-binarized images may preferably correspond to text characters represented on a dual background. In other words, and as exemplified by the "2" and "7" characters in the rewards card number portion "2789" of card 320 as shown in FIG. 3C, the background region upon which the character is represented includes portions which are darker than the character, and portions which are lighter than the character. This makes identifying the character difficult as no single threshold will adequately distinguish the character from both portions of the dual background.

To demonstrate the improved recall achieved via utilizing the presently disclosed inventive techniques, systems, and computer program products, relative to conventional thresholding, recognition and extraction techniques, an experimental evaluation in which digital images depicting non-embossed documents having complex backgrounds, and/or elements of interest depicted according to different polarities within a single document, employing the presently disclosed inventive techniques improved credit card number recall and reduced the field error rate by approximately 50% or more as compared to using the traditional recognition and extraction techniques such as global thresholding, local (i.e. adaptive) thresholding, etc., either alone or in combination with the techniques of the '351 patent application. Notably, this reduction in error rate was achieved using exemplary text documents such as credit cards, driver's licenses, etc. characterized by a complex background such as shown in FIGS. 3A and 3C.

Figure 5:
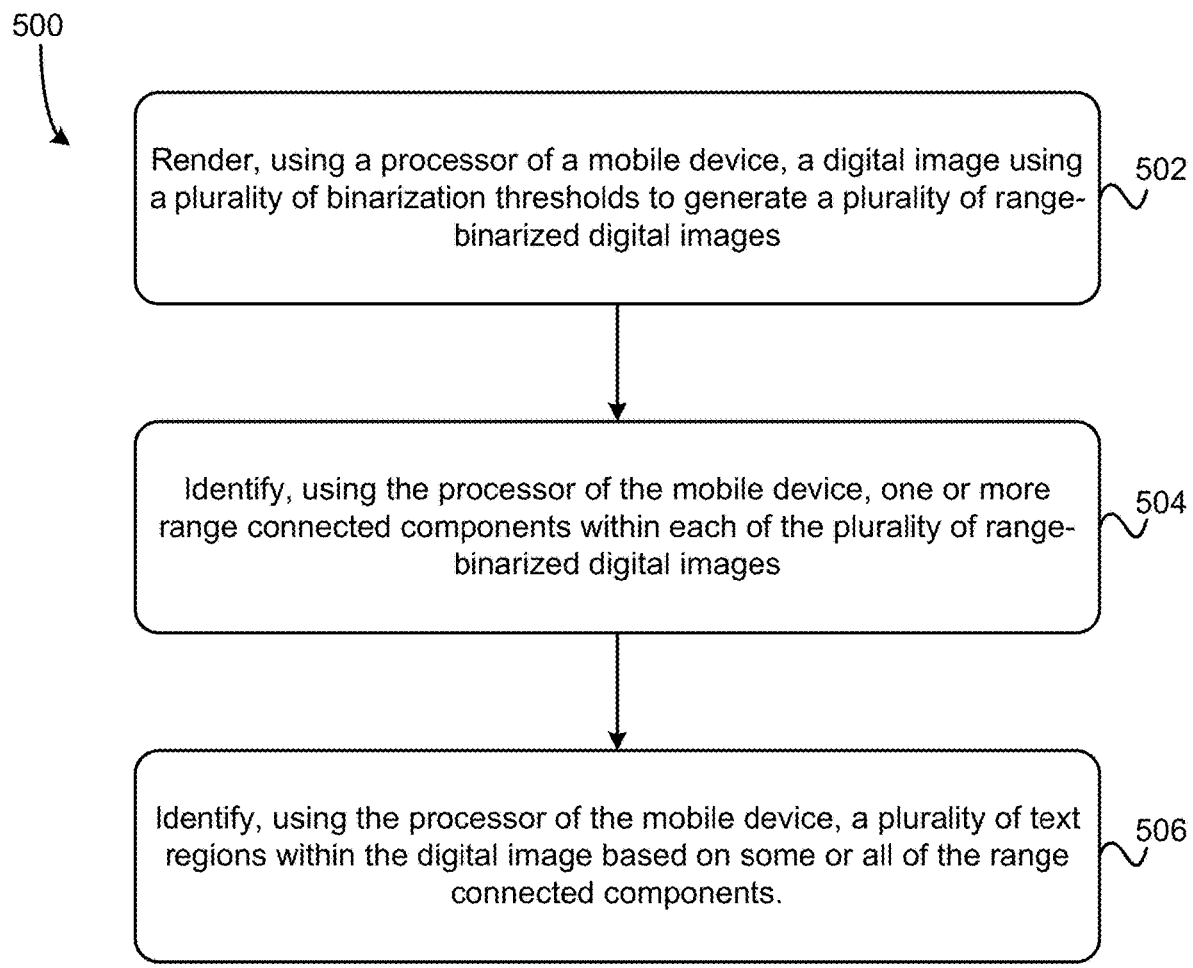
FIG. 5 is a flowchart of a method, according to one embodiment.

Turning now to FIG. 5, and a particularly preferred implementation of the presently disclosed inventive concepts, a method 500 may be employed to facilitate improved data extraction using range-binarized images as the primary vehicle for improvements over conventional thresholding. The method 500 may be performed in accordance with the present invention in any of the environments depicted in FIGS. 1-3C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor of a mobile device, a processor of a workstation or server environment, some other device having one or more processors therein, or any combination thereof.

The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a digital image is rendered using a plurality of binarization thresholds. The renderings generate a plurality of range-binarized digital images, e.g. as set forth above method 400.

In operation 504, range connected components are identified within the range-binarized digital images. The range connected components may be identified in any suitable manner described herein, particularly regarding method 400 above.

Method 500 also includes operation 506, in which text regions within the digital image are identified based on some or all of the range connected components identified within the range-binarized digital images. Optionally, connected components identified from other renderings of the digital image may be employed, e.g. connected components of black and/or white pixels identified according to method 400, above.

According to the preferred implementation of method 500, no inverted images need be generated or rendered bitonal using a separate set of binarization thresholds. However, this does not preclude the improved identification and extraction of elements represented according to different polarities. For instance, a two-pass procedure such as described above may be implemented, each pass progressively including more pixels in the set for identification of connected components, but starting from opposite extremes of the intensity spectrum. The first pass may identify dark elements represented on relatively bright background, and the second pass may favor bright elements represented on relatively dark backgrounds.

Moreover, method 500 may be implemented using any number of additional and/or alternative features, operations, etc., including the alternative or optional features, operations, etc. described above as being useful in combination with or in the context of method 400 (i.e. confidence evaluation, rendering of native and/or inverted image representations using different sets of binarization thresholds and/or combinations thereof (e.g. to generate range-binarized renderings), identification of black, white, and/or range connected components therein (optionally against dual backgrounds), use of such connected components in defining the text regions in the digital image, calculating geometric characteristics of connected components, grouping adjacent components based on geometric characteristics, recognizing text with improved recall rate, etc. as described hereinabove regarding method 400).

For instance, in a particularly preferred embodiment, the text regions may optionally be identified based on the connected components identified from within the range-binarized images, as well as connected components identified from binarized digital images, e.g. black components and white components as identified per operations 404-406 of method 400 above.

In various approaches, the particular components (black, white, and/or range) targeted for detection using the inventive concepts presented herein may depend on a-priori knowledge (or lack thereof) regarding the content of the digital image. Use of a priori knowledge may significantly reduce the computational cost of detecting text regions in accordance with the inventive approaches presented herein. For example, if we know that text is always darker than local background for a particular type of document, then only black components (which may still be obtained from multiple thresholds because local background can vary within the image) may be necessary. The opposite is true if a-priori knowledge indicates the text is always brighter than local backgrounds for the particular type of document. In situations where documents are known to exhibit complex (e.g. dual) backgrounds, it may be necessary to seek black components, white components, and range components in combination to maximize the recall rate.

An example when this a-priori knowledge is available can be a set of driver licenses with reddish security background but always black printing. In this case it is most preferable to use the red channel (since reddish pixels in the background will have high red channel values, and thus appear relatively bright in the gray-level representation of the red channel) and go only after black components. This makes performing the text region identification process more computationally efficient, and reduces possible false positives.

In one aspect method 500 may include evaluating, using a processor of the mobile device, a server, etc., a confidence of an identity of each of the connected components that were identified within the plurality of range-binarized digital images. Evaluating confidence reduces negative outcomes associated with false positive component identification (e.g. additional computational cost of analyzing regions depicting non-text characters to identify and/or extract such characters, such as via OCR). Accordingly, the one or more connected components within the plurality of range-binarized digital images that are utilized to identify the plurality of text regions within the digital image may include only those connected components having an identity confidence level value above a predefined identity confidence threshold. The predefined identity confidence threshold may be determined as noted above.

Moreover, identifying text regions may include: calculating one or more geometric characteristics of the one or more connected components identified within the plurality of range-binarized digital images; grouping adjacent of the one or more connected components that exhibit one or more common geometric characteristics; defining each grouping of three or more adjacent connected components that exhibit the one or more common geometric characteristics as a candidate text region; and assembling the candidate text regions by removing overlaps to identify the plurality of text regions within the digital image. The geometric characteristics may be selected from the same group as set forth above regarding method 400.

Recognizing text within the text regions identified based on the connected components determined from the range-binarized digital images may also convey an improvement in field error rate of about 50% relative to conventional binarization techniques, in accordance with method 500. For instance, a field error rate of approximately 40% (e.g. corresponding to ~60% recall) may be reduced to about 20% (80% recall).

The improvements may be achieved for elements of interest represented according to different polarities and/or on dual backgrounds. Accordingly, in line with method 500 at least one of the black connected components identified within the plurality of binarized digital images corresponds to a darker text character represented on a lighter background within the original (grayscale or color) image, at least one of the white connected components identified within the plurality of binarized digital images corresponds to a lighter text character represented on a darker background within the original image, and/or at least one of the connected components identified within the plurality of range-binarized digital images corresponds to a text character represented on a dual background within the original image.

The presently disclosed inventive concepts are to be understood as an improvement to the function of image processing devices in that elements of interest may be located, extracted, and recognized with substantially improved recall, error rate, etc. (e.g. as noted above) compared to conventional recognition and extraction techniques. Moreover, this recall rate is accomplished for digital images including elements of interest depicted according to different polarizations.

Further still, the presently disclosed inventive concepts convey the advantage of effectively discriminating between "character-like" connected components and other connected components (e.g. representing lines, images, logos, holograms, etc. which are typically part of the background upon which characters are superimposed). In particular, by leveraging recognition as part of the process for identifying text regions within the digital image, the presently disclosed inventive techniques attempt to discern whether identified connected components within the thresholded images are likely characters, e.g. using OCR.

A confidence measure may be generated indicating the likelihood that a particular component is a character, and connected components having a confidence value below a character confidence threshold are preferably excluded from the set of components used to define the locations within the digital image that depict text, i.e. the text regions. Preferably, the presently disclosed inventive concepts include the use of a confidence measure that is determined or derived from a recognition process such as OCR, ICR, etc. (e.g. for text characters), a learn-by-example classification process (e.g. for non-textual image features), or any other suitable technique for evaluating confidence of a recognition process/result, as would be understood by a person having ordinary skill in the art upon reading the present descriptions.

In some, particularly preferred approaches, the digital image may be binarized using various binarization thresholds, and connected components represented in the resulting binary representation of the digital image may be evaluated according to one or more pre-recognition parameters in order to make an initial determination as to whether the various components in the binary representation are likely to be or correspond to characters represented in the digital image. For instance, by evaluating component properties, particularly height, aspect ratio, density, number of horizontal and/or vertical crossings etc. and evaluating against predefined thresholds such as known or common ranges for character heights depicted on documents, it is possible to filter out components that, due to the size of the component, are unlikely to be or correspond to a character. This filtering advantageously reduces the computational cost associated with attempting to determine, via recognition, whether the connected components depicted in the binary representation are or correspond to characters.

While the present descriptions of recognition-guided thresholding and data extraction within the scope of the instant disclosure have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may include a computer readable storage medium having program code embodied therewith, the program code readable/executable by a processor to cause the processor to perform steps of a method as described herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

Accordingly, one embodiment of the present invention includes all of the features disclosed herein, including those shown and described in conjunction with any of the FIGS. Other embodiments include subsets of the features disclosed herein and/or shown and described in conjunction with any of the FIGS. Such features, or subsets thereof, may be combined in any way using known techniques that would become apparent to one skilled in the art after reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising a non-transitory computer readable storage medium having embodied thereon computer readable program instructions configured to cause a processor, upon execution of the computer readable program instructions, to:
   render a digital image using a plurality of binarization thresholds to generate a plurality of binarized digital images, wherein at least some of the binarized digital images are generated using one or more binarization thresholds that are determined based on a priori knowledge regarding an object depicted in the digital image;
   identify one or more connected components within the plurality of binarized digital images;
   calculate one or more geometric characteristics of the one or more connected components identified within the plurality of binarized digital images,
   group adjacent of the one or more connected components that exhibit one or more common geometric characteristics; and
   define each grouping of three or more adjacent connected components that exhibit the one or more common geometric characteristics as a candidate text region.

2. The computer program product as recited in claim 1, further comprising computer readable program instructions configured to cause the processor, upon execution of the computer readable program instructions, to:
   identify one or more connected components of black pixels within the plurality of binarized digital images;
   identify one or more connected components of white pixels within the plurality of binarized digital images; and
   wherein the candidate text regions are defined further based on either or both of:
      some or all of the connected components of black pixels identified within the plurality of binarized digital images; and
      some or all of the connected components of white pixels identified within the plurality of binarized digital images.

3. The computer program product as recited in claim 1, further comprising computer readable program instructions configured to cause the processor, upon execution of the computer readable program instructions, to:
   evaluate a confidence of an identity of each of the connected components identified within the plurality of binarized digital images; and
   wherein the connected components that are utilized to define the candidate text regions within the digital image consist of connected components having an identity confidence level value above a predefined identity confidence threshold.

4. The computer program product as recited in claim 1, wherein the computer readable program instructions configured to cause the processor, upon execution of the computer readable program instructions, to identify the one or more text regions within the digital image comprise computer readable program instructions configured to cause the processor, upon execution of the computer readable program instructions, to: assemble the candidate text regions by removing overlaps therefrom;
   wherein the one or more geometric characteristics are selected from the group consisting of: a connected component baseline, a connected component top line, a connected component height, a connected component stroke thickness, a connected component density, a connected component number of vertical crossings, a connected component number of horizontal crossings, color information corresponding to the connected component, and combinations thereof; and
   wherein the color information corresponding to the connected component is represented in, or derived from, the digital image.

5. The computer program product as recited in claim 1, wherein the a priori knowledge regarding the object comprises one or more knowledge points selected from the group consisting of: a location within the digital image depicting one or more elements of interest, color channel information regarding one or more elements of interest depicted in the digital image, and color channel information regarding a background of a predetermined region of the digital image.

6. The computer program product as recited in claim 1, further comprising computer readable program instructions configured to cause the processor, upon execution of the computer readable program instructions, to:
generate an inverted representation of the digital image;
render the inverted representation of the digital image using a second plurality of binarization thresholds to generate a second plurality of binarized digital images; and
identify one or more range connected components within the second plurality of binarized digital images; and
wherein defining the candidate text regions within the digital image is further based on some or all of the range connected components identified within the second plurality of binarized digital images.

7. The computer program product as recited in claim 1, further comprising computer readable program instructions configured to cause the processor, upon execution of the computer readable program instructions, to:
render the digital image using a second plurality of binarization thresholds to generate a second plurality of binarized digital images; and
identify one or more connected components within the second plurality of binarized digital images;
wherein the computer readable program instructions configured to cause the processor, upon execution of the computer readable program instructions, to: identify, using the processor, the one or more connected components within the plurality of binarized digital images comprises computer readable program instructions configured to cause the processor, upon execution of the computer readable program instructions, to select, for at least one of the plurality of binarized digital images, one or more pixels having an intensity value above the binarization threshold used to generate the respective at least one of the plurality of binarized digital images; and
wherein the computer readable program instructions configured to cause the processor, upon execution of the computer readable program instructions, to: identify the one or more connected components within the second plurality of binarized digital images comprises computer readable program instructions configured to cause the processor, upon execution of the computer readable program instructions, to select, for at least one of the second plurality of binarized digital images, one or more pixels having an intensity value below the binarization threshold used to generate the respective at least one of the second plurality of binarized digital images.

8. A computer-implemented method, comprising:
rendering, using a processor, a digital image using a plurality of binarization thresholds to generate a plurality of range-binarized digital images, wherein each rendering of the digital image is generated using a different combination of the plurality of binarization thresholds, and wherein each combination of the plurality of binarization thresholds includes a unique upper threshold and a unique lower threshold;
identifying, using the processor, one or more range connected components within the plurality of range-binarized digital images; and
identifying, using the processor, one or more text regions within the digital image based on some or all of the range connected components.

9. The method as recited in claim 8, further comprising:
identifying, using the processor, one or more range connected components of black pixels within the plurality of range-binarized digital images;
identifying, using the processor, one or more range connected components of white pixels within the plurality of range-binarized digital images; and
wherein the one or more text regions are identified further based on either or both of:
some or all of the range connected components of black pixels identified within the plurality of range-binarized digital images; and
some or all of the range connected components of white pixels identified within the plurality of range-binarized digital images.

10. The method as recited in claim 8, further comprising evaluating, using the processor, a confidence of an identity of each of the range connected components identified within the plurality of range-binarized digital images; and
wherein the one or more range connected components within the plurality of range-binarized digital images that are utilized to identify the one or more text regions within the digital image consist of range connected components having an identity confidence level value above a predefined identity confidence threshold.

11. The method as recited in claim 8, wherein identifying the one or more text regions within the digital image comprises:
calculating, using the processor, one or more geometric characteristics of the one or more range connected components identified within the plurality of range-binarized digital images;
grouping, using the processor, adjacent of the one or more range connected components that exhibit one or more common geometric characteristics;
defining, using the processor, each grouping of three or more adjacent range connected components that exhibit the one or more common geometric characteristics as a candidate text region; and
assembling, using the processor, the candidate text regions by removing overlaps to identify the one or more text regions within the digital image; and
wherein the one or more geometric characteristics are selected from the group consisting of: a range connected component baseline, a range connected component top line, a range connected component height, a range connected component stroke thickness, a range connected component density, a range connected component number of vertical crossings; a range connected component number of horizontal crossings, color information corresponding to the range connected component, the color information being represented in or derived from the digital image, and combinations thereof.

12. The method as recited in claim 8, wherein some or all of the plurality of binarization thresholds are determined based on a priori knowledge regarding an object depicted in the digital image.

13. The method as recited in claim 12, wherein the a priori knowledge regarding the object comprises one or more knowledge points selected from the group consisting of: a location within the digital image depicting one or more elements of interest, color channel information regarding one or more elements of interest depicted in the digital image, and color channel information regarding a background of a predetermined region of the digital image.

14. The method as recited in claim 8, further comprising:
generating, using the processor, an inverted representation of the digital image;
rendering, using the processor, the inverted representation of the digital image using a second plurality of binarization thresholds to generate a second plurality of range-binarized digital images; and
identifying, using the processor, one or more range connected components within the second plurality of range-binarized digital images; and
wherein identifying the one or more text regions within the digital image is further based on some or all of the range connected components identified within the second plurality of range-binarized digital images.

15. The method as recited in claim 8, further comprising:
rendering, using the processor, the digital image using a second plurality of binarization thresholds to generate a second plurality of range-binarized digital images; and
identifying, using the processor, one or more range connected components within the second plurality of range-binarized digital images;
wherein identifying, using the processor, the one or more range connected components within the plurality of range-binarized digital images comprises, for at least one of the plurality of range-binarized digital images, selecting one or more pixels having an intensity value above the binarization threshold used to generate the respective one of the plurality of range-binarized digital images; and
wherein identifying, using the processor, one or more range connected components within the second plurality of range-binarized digital images comprises, for at least one of the second plurality of range-binarized digital images, selecting one or more pixels having an intensity value below the binarization threshold used to generate the at least respective one of the second plurality of range-binarized digital images.

16. A server system, comprising a processor and logic integrated with and/or executable by the processor to cause the processor to:
render a digital image using a plurality of binarization thresholds to generate a plurality of range-binarized digital images, wherein each rendering of the digital image is generated using a different combination of the plurality of binarization thresholds, and wherein each combination of the plurality of binarization thresholds includes a unique upper threshold and a unique lower threshold;
identify one or more range connected components within the plurality of range-binarized digital images; and
identify a one or more text regions within the digital image based on some or all of the range connected components identified within the plurality of range-binarized digital images.

17. The server system as recited in claim 16, wherein some or all of the plurality of binarization thresholds are determined based on a priori knowledge regarding an object depicted in the digital image.

18. The server system as recited in claim 17, wherein the a priori knowledge regarding the object comprises one or more knowledge points selected from the group consisting of: a location within the digital image depicting one or more elements of interest, color channel information regarding one or more elements of interest depicted in the digital image, and color channel information regarding a background of a predetermined region of the digital image.

19. The server system as recited in claim 16, further comprising logic integrated with and/or executable by the processor to cause the processor to:
generate an inverted representation of the digital image;
render the inverted representation of the digital image using a second plurality of binarization thresholds to generate a second plurality of range-binarized digital images; and
identify one or more range connected components within the second plurality of range-binarized digital images; and
wherein identifying the one or more text regions within the digital image is further based on some or all of the range connected components identified within the second plurality of range-binarized digital images.

20. The server system as recited in claim 16, further comprising logic integrated with and/or executable by the processor to cause the processor to:
render the digital image using a second plurality of binarization thresholds to generate a second plurality of range-binarized digital images; and
identify one or more connected components within the second plurality of range-binarized digital images;
wherein the logic integrated with and/or executable by the processor to cause the processor to identify the one or more connected components within the plurality of range-binarized digital images comprises logic integrated with and/or executable by the processor to cause the processor, for at least one of the plurality of range-binarized digital images, to select one or more pixels having an intensity value above the binarization threshold used to generate the respective at least one of the plurality of range-binarized digital images; and
wherein the logic integrated with and/or executable by the processor to cause the processor to identify the one or more connected components within the second plurality of range-binarized digital images comprises logic integrated with and/or executable by the processor to cause the processor, for at least one of the second plurality of range-binarized digital images, to select one or more pixels having an intensity value below the binarization threshold used to generate the respective at least one of the second plurality of range-binarized digital images.

* * * * *